United States Patent [19]

Ward

[11] 3,898,114

[45] Aug. 5, 1975

[54] RELEASE PAPER FOR USE IN FORMING PLASTIC LAMINATES

[75] Inventor: Franklin J. Ward, South Portland, Maine

[73] Assignee: Scott Paper Company, Philadelphia, Pa.

[22] Filed: Mar. 11, 1974

[21] Appl. No.: 449,918

Related U.S. Application Data

[63] Continuation-in-part of Ser. No. 187,818, Oct. 8, 1971, abandoned.

[52] U.S. Cl. .................. 156/90; 106/189; 156/289; 428/40
[51] Int. Cl.² ........................................ B32B 31/06
[58] Field of Search ............ 106/189, 196; 156/289, 156/90; 117/161 C; 161/406; 428/40

[56] References Cited

UNITED STATES PATENTS

| | | | |
|---|---|---|---|
| 2,431,684 | 12/1947 | Brophy | 117/6 |
| 2,440,626 | 4/1948 | Young et al. | 106/189 |
| 3,329,509 | 7/1967 | Julius | 106/189 |
| 3,640,741 | 2/1972 | Estes | 106/189 |

*Primary Examiner*—Edward G. Whitby
*Attorney, Agent, or Firm*—John A. Weygandt; John W. Kane

[57] ABSTRACT

A release paper for use in laminating acrylic and polyester sheets having a release coating comprising poly(vinyl alcohol) and methyl cellulose.

3 Claims, No Drawings

RELEASE PAPER FOR USE IN FORMING PLASTIC LAMINATES

RELATED APPLICATION

This application is a continuation-in-part of Ser. No. 187,818 filed Oct. 8, 1971 now abandoned.

BACKGROUND OF THE INVENTION

The present invention relates to release coatings for paper and related fibrous substrates. Such release coatings are characterized by their ability to separate intact from a surface which is normally adherent.

DESCRIPTION OF THE PRIOR ART

In recent years, because of their advantages in certain applications, there has been widespread interest in decorative plastic laminates. These laminates have gained increased use as structural materials for the manufacture of various furniture articles such as cabinets, table tops and vanities as well as other uses such as paneling, wall coverings, partitions and doors.

A conventional manner of forming these laminates is to place a lamination "sandwich" composed of a plastic layer and a desired substrate in a press and to mold them together by means of heat and pressure. The plastic layer may take the form of a resin impregnated or coated paper, known as a "prepreg." Alternatively, it may be in the form of a self-supporting plastic film. The substrate may be several fibrous layers, particle board or chipboard.

When the laminate materials are placed in the press, a piece of release paper or other material having a release surface is placed in contact with the plastic layer on the side opposite the substrate. This not only prevents the plastic layer from adhering to the press, but, more importantly, imparts the surface characteristics of the release paper to the plastic surface to be molded. Thus, as a result of being molded in contact with the release coated surface, the plastic surface will have a smooth, textured, matte, glossy, or other desired finish. Obviously, because of the conditions in the press and the nature of the plastic, the release paper must have very good release characteristics. Release coatings in common usage today employ conventional release agents such as a silicone resin or a complex of stearic acid and chromic chloride. Both of these release agents are fairly expensive. Poly(vinyl alcohol), a commonly used release agent for casting plastic sheets and an inexpensive agent compared to the previously mentioned agents, has provided only minimal release for laminating purposes.

SUMMARY OF THE INVENTION

The present invention provides a release paper having thereon a release coating comprising poly(vinyl alcohol) and methyl cellulose. This release coated paper provides excellent release in the manufacture of decorative plastic laminates.

Quite often when decorative plastic laminates are being discussed, the terms "low-pressure laminates" and "high-pressure laminates" are used. "Low" typically designates pressures less than 500 pounds per square inch (psi) and "high," pressures of 1,000 psi or more. These terms take into consideration only pressure conditions. Obviously, press temperatures and actual durations of pressure are relevant to the release characteristics required of the release paper. Pressures in the range of 200–1,000 psi have been successfully employed using paper according to the present invention. For this reason, although the products made in accordance with the method of the present invention typify those recognized in the art as "low-pressure" laminates, applicant's invention is not limited to the use of low pressures.

The release coating formulation of the present invention is applied to a substrate prepared so that the coating will not excessively penetrate the substrate. A preferred substrate is a paper base provided with one or more intermediate coatings of a conventional pigment-adhesive type which serve to prevent the release coating from soaking into the paper base and to ensure the hold-out necessary for release.

In accordance with the present invention, if the release coating contains from an effective amount up to approximately 20% of methyl cellulose based on the weight of poly(vinyl alcohol), it provides excellent release in the pressing of laminates employing resins such as polyesters and acrylics. As will be illustrated in greater detail hereinafter the effective amount of methyl cellulose is on the order of a negligible or trace amount and need only be greater than 100 parts per million or 0.01% based on the weight of poly(vinyl alcohol). When the concentration of methyl cellulose exceeds 20% release becomes dramatically "harder," i.e., much greater force is required to remove the coated paper from the pressed laminate. Further, the esthetic qualities of the coated paper, as measured by the features of mottle and gloss, decline markedly. A coating formulation containing in excess of 20% methyl cellulose will not spread well and as a result the coated sheet suffers from a mottled appearance. In addition, the coating begins to lose its glossy appearance as this level is exceeded.

Surprisingly, if a compound closely related to methyl cellulose, such as hydroxyethyl cellulose or carboxymethyl hydroxyethyl cellulose is used in place of methyl cellulose, satisfactory release is not achieved. A further indication of the unexpectedness of the present discovery is that, while both poly(vinyl alcohol) and methyl cellulose have long been known for independent use as release coatings in casting vinyl sheets (see U.S. Pat. No. 2,819,191), when methyl cellulose is combined with poly(vinyl alcohol) as a release surface on casting paper, performance level is reduced when compared with release coatings of either poly(vinyl alcohol) or methyl cellulose used alone on casting paper. Workers in the casting art have known that when a release coating contains a combination of methyl cellulose and poly(vinyl alcohol) it is more difficult to strip a cured, cast vinyl sheet from the release paper than from a release paper having a coating containing either compound alone and consequently have avoided the use of such a combination.

The principles, features and advantages of the invention will be further understood upon a consideration of the following illustrative examples. In the following examples, the poly(vinyl alcohol) employed was of the type commercially designated as "lower" molecular weight. The selection of a particular type of poly(vinyl alcohol) is not regarded as critical to the present invention and is well within the skill of the ordinary worker in the art to which this invention pertains.

DESCRIPTION OF THE PREFERRED EMBODIMENTS

EXAMPLE I

A release coating formulation was prepared by mixing the following:

| Parts Solids | | Parts by Weight |
|---|---|---|
| 100 | Poly(vinyl alcohol), aqueous solution at 15% solids | 667 |
| 5 | Methyl cellulose, aqueous | 100 |
| | Water in an amount to provide a formulation having 11.6% by weight solids | 138 |

This coating was applied to a bodystock weighing 60 pounds per ream (3,300 sq. ft.) which had been previously coated with two separate intermediate coatings of a conventional pigment-adhesive formulation. The release coating was applied by air blade coater at the rate of three pounds per ream, dry weight basis, and dried with air heated to 285°F.

A lamination "sandwich" was prepared by placing over a ½ inch thick chip board support a polyester resin "prepreg" and then the release coated paper with its release surface in contact with the polyester resin layer. This sandwich was placed in a press and pressed for 15 minutes at 300 pounds per square inch (psi) with the temperature at 343°F, after which time it was removed and allowed to cool for 3 minutes. The release paper was then stripped from the polyester surface. It released cleanly and imparted its own surface characteristics to the polyester surface.

EXAMPLE II

A release coating formulation was prepared by mixing the following:

| Parts Solids | | Parts by Weight |
|---|---|---|
| 100 | Poly(vinyl alcohol), aqueous solution at 15% solids | 667 |
| 2 | Methyl cellulose, aqueous solution at 2% solids | 100 |
| | Water in an amount to provide a formulation having 11.3% by weight solids | 138 |

This coating formulation was applied by air blade coater to the base coated bodystock used in Example I at a rate to provide a coating weight of three pounds per ream, dry weight basis, upon drying as in Example I.

A composite was prepared by placing the release coated paper over two plies of polyester saturated kraft sheets. This composite was then placed in a press at room temperature and pressed at 750 psi with the temperature raised to 300°F. These conditions were maintained for four minutes and then the temperature was lowered back to 72°F. The press was opened and the laminate was then removed. The release paper stripped cleanly with results comparable to those of Example I.

EXAMPLE III

A sandwich was prepared by placing over a vinyl-resin-impregnated asbestos board one-eighth inch in thickness a layer of a modified acrylic resin (Rohm & Haas "Korad A"). Over this layer was placed a release-coated paper prepared according to Example I. This sandwich was then placed in a press and pressed at 600 psi for 2 minutes at 330°F, after which time it was removed and the release paper was stripped from the acrylic layer. Results were comparable to those obtained in Example I.

While concentrations in the range of 2 to 5% methyl cellulose are considered preferred in order to insure good results from a commercial coating operation, the following two examples are included to show that successful results can be obtained at concentrations substantially less than 2%.

EXAMPLE IV

A release coating formulation was prepared by mixing the following:

| Parts Solids | | Parts by Weight |
|---|---|---|
| 100 | Poly(vinyl alcohol), aqueous solution at 15% solids | 667 |
| 0.5 | Methyl cellulose, aqueous solution at 5% solids | 10 |
| | Water in an amount to provide a formulation having 13% by weight solids | 90 |

This coating formulation was applied to a base coated bodystock of the type used in Example I by air blade coater at the rate of three pounds per ream, dry weight basis and dried with air heated to 300°F.

A lamination "sandwich" was prepared by placing over a 1 inch thick chipboard support, a polyester resin "prepreg" and then the release coated paper with its release surface in contact with the polyester resin layer. This sandwich was placed in a press and pressed for 10 minutes at 200 psi with the temperature at 320°F after which time it was removed and allowed to cool for 3 minutes. The release paper was then stripped from the polyester surface.

EXAMPLE V

A release coating formulation was prepared by mixing the following:

| Parts Solids | | Parts by Weight |
|---|---|---|
| 100 | Poly(vinyl alcohol), aqueous solution at 15% solids | 667 |
| 0.1 | Methyl cellulose, aqueous solution at 1% solids | 10 |
| | Water in an amount to provide a formulation having 13% by weight solids | 90 |

This coating formulation was applied to a base coated body-stock of the type used in Example I by air blade coater at the rate of three pounds per ream, dry weight basis and dried with air heated to 300°F.

A lamination "sandwich" was prepared by placing over a one inch thick chipboard support, a polyester resin "prepreg" and then the release coated paper with its release surface in contact with the polyester resin layer. This sandwich was placed in a press and pressed for 10 minutes at 200 psi with the temperature at 320°F after which time it was removed and allowed to cool for 6 minutes. The release paper was then stripped from the polyester surface, although the force required to strip the paper was noticeably greater than in Example IV and would be characterized by the worker in the art as "hard."

EXAMPLE VI

A release coating formulation was prepared by mixing the following:

| Parts Solids | | Parts by Weight |
|---|---|---|
| 100 | Poly(vinyl alcohol), aqueous solution at 15% solids | 667 |
| 0.01 | Methyl cellulose, aqueous solution at 1% solids | 1 |
| | Water in an amount to provide a formulation having 13% by weight solids | 100 |

This coating formulation was applied to a base coated bodystock of the type used in Example I by air blade coater at the rate of three pounds per ream, dry weight basis and dried with air heated to 300°F.

A lamination "sandwich" was prepared by placing over a 1 inch thick chipboard support, a polyester resin "prepreg" and then the release coated paper with its release surface in contact with the polyester resin layer. This sandwich was placed in a press and pressed for 10 minutes at 200 psi with the temperature at 320°F after which time it was removed and allowed to cool. The release paper, however, would not strip from the polyester surface regardless of the length of cooling period.

From a comparison of Examples V and VI it may be seen that an effective amount of methyl cellulose is in excess of 0.01% (100 ppm) but can be less than 0.1% of the weight of the poly (vinyl alcohol). Exactly where the lower limit would lie within this range would depend upon the particular resin comprising the laminate and the press conditions of heat and pressure. Further, as is well known to the ordinary worker in the art to which the present invention pertains, varying degrees of hardness of release can be tolerated depending on the nature of the individual operation. What one manufacturer would consider unacceptably hard release might be acceptable to another.

Other variations and modifications may occur to one of ordinary skill in the art without departing from the present invention. Accordingly, it should be understood that the embodiments described above are illustrative only and not intended to limit the scope of the invention, as defined in the appended claims.

What is claimed is:

1. In a method of laminating sheets of acrylic or polyester resins which includes the step of pressing a sheet of resin against a piece of paper having an easy-release surface, the improvement which comprises pressing the sheet against a piece of paper having a release coating comprising poly(vinyl alcohol) and from an effective amount greater than 0.01 up to 20% of methyl cellulose based on the weight of the poly(vinyl alcohol).

2. The method in accordance with claim 1 wherein the release coating comprises from 2 to 20% methyl cellulose.

3. The method in accordance with claim 1 wherein the release coating comprises from 5 to 20% methyl cellulose.

\* \* \* \* \*